C. F. WASHBURN.
TRACTION WHEEL.
APPLICATION FILED FEB. 24, 1914.
1,144,574.
Patented June 29, 1915.
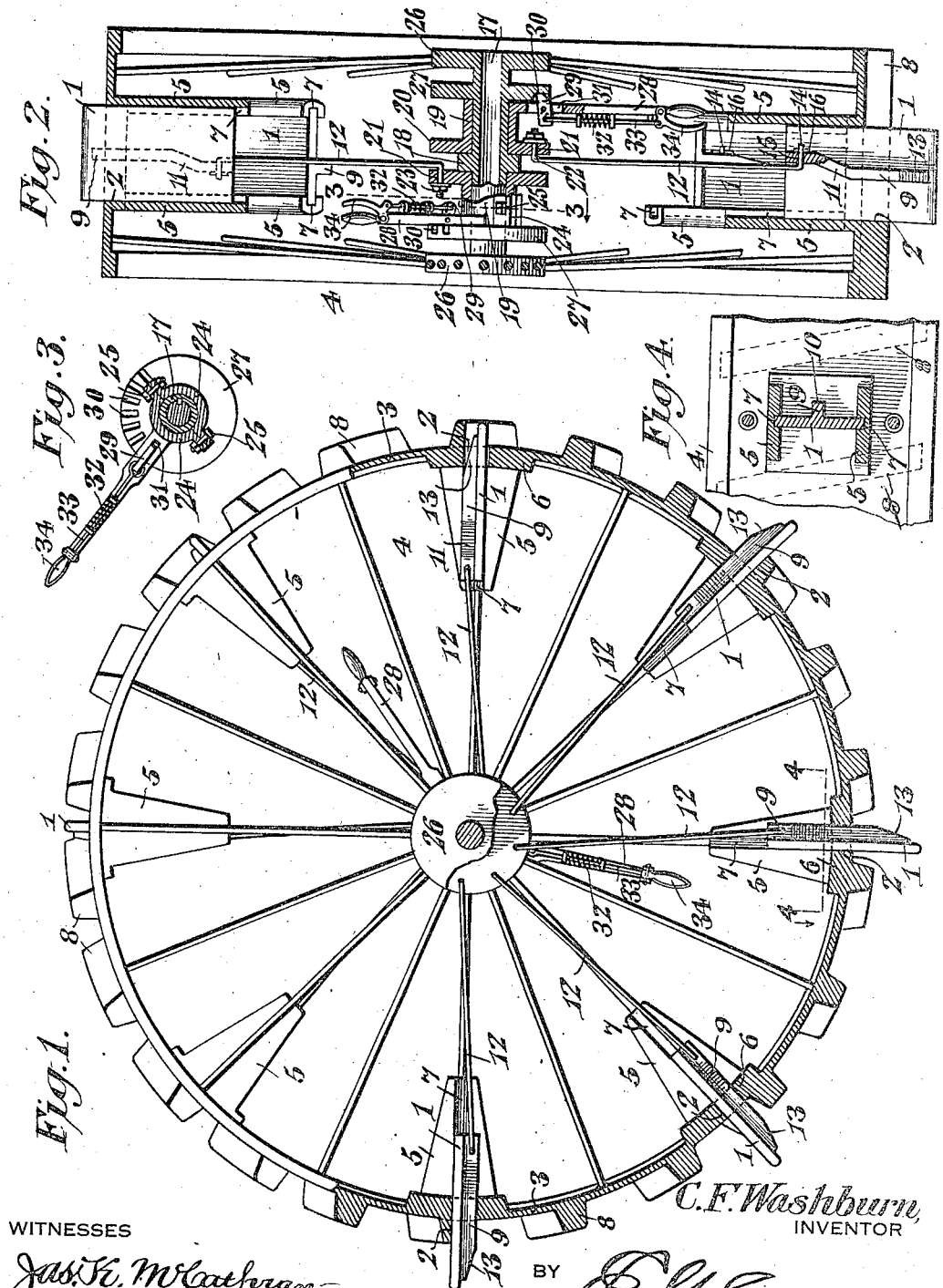
WITNESSES
C. F. Washburn,
INVENTOR
BY
ATTORNEY

UNITED STATES PATENT OFFICE.

CLAUDE F. WASHBURN, OF GRAND RAPIDS, WISCONSIN, ASSIGNOR OF ONE-HALF TO HARVEY GEE, OF GRAND RAPIDS, WISCONSIN.

TRACTION-WHEEL.

1,144,574.   Specification of Letters Patent.   Patented June 29, 1915.

Application filed February 24, 1914. Serial No. 820,664.

*To all whom it may concern:*

Be it known that I, CLAUDE F. WASHBURN, a citizen of the United States, residing at Grand Rapids, in the county of Wood and State of Wisconsin, have invented a new and useful Traction-Wheel, of which the following is a specification.

The invention relates to improvements in traction wheels.

The object of the present invention is to improve the construction of traction wheels and to provide a simple, practical, and efficient device of strong and durable construction, designed for use on the drive wheels of traction engines, and also on the front wheels thereof, to prevent the drive wheels from slipping or burying themselves in the ground and to keep the front wheels from skidding, and equipped with extensible plates located at the rim of the wheel and capable of being readily operated to project them the desired distance for use on soft roads and to retract them when they are not required.

A further object of the invention is to arrange the extensible plates in two sets or series, adapted to be successively operated, each set or series extending substantially around one-half of the wheel, so that the set or series out of contact with the ground may be readily extended into operative position, and the other set operated after the wheel has made a half revolution, whereby the pressure of the traction wheel against the ground will not interfere with the operating means for moving the plates inwardly and outwardly.

With these and other objects in view the invention consists in the construction and novel combination of parts hereinafter fully described, illustrated in the accompanying drawings, and pointed out in the claims hereto appended, it being understood that various changes in form, proportion, size and minor details of construction, within the scope of the claims, may be resorted to without departing from the spirit or sacrificing any of the advantages of the invention.

In the drawing: Figure 1 is a side elevation, partly in section, of a traction wheel provided with an anti-slipping and anti-skidding device constructed in accordance with this invention. Fig. 2 is a transverse sectional view of the same. Fig. 3 is a detail sectional view on the line 3—3 of Fig. 2. Fig. 4 is a detail sectional view on the line 4—4 of Fig. 1.

Like numerals of reference designate corresponding parts in all the figures of the drawing.

In the accompanying drawing, in which is illustrated the preferred embodiment of the invention, 1 designates radially arranged transversely disposed plates or blades of substantially oblong form, located at and adapted to be projected through slots 2 of the rim 3 of a traction wheel 4, which is provided at the ends of the slots with opposite inwardly extending guides 5 for the plates or blades 1. The rim 3 of the traction wheel is preferably enlarged or thickened at 6 at the points where the slots occur and the guides 5 are arranged, and the said guides, which are preferably tapered, extend inwardly from the thickened portion 6 and are provided in their inner faces with radially arranged grooves 7 which receive and guide the side edges of the plates or blades 1. The rim of the traction wheel is designed to be provided at its outer face with diagonally disposed ribs 8 of the usual construction, and the rim may have a smooth exterior to adapt it for use on improved roads, but any other desired construction of tread may, of course, be employed. The blades are provided at one of their faces with a longitudinal rib 9 slidable through a notch 10 in the rim of the wheel and having an inner laterally deflected portion 11 to enable a straight connecting rod 12 to be employed. The ribs, besides forming a convenient means for the attachment of the outer ends of the connecting rods, operate to reinforce the plates or blades 1, and their outer portions 13 are preferably beveled, as shown.

The extensible plates or blades are preferably arranged in two sets or series, each set or series being disposed over approximately one-half of the traction wheel, so that the two sets or series may be operated independently of each other to permit the plates or blades out of contact with the ground to be extended so as to prevent the ground from interfering with the operation of the blades. After one set or series is extended, and wheel is permitted to rotate to carry the other set or series clear of the ground for easy operation. By this construction and operation the plates or blades may be extended into position for operation of a soft road or other bad spot prior to passing over the same. The outer ends 14 of the connecting rods are bent at right angles to form lateral pivots and are arranged in perforations 15 of the laterally deflected portions 11 of the ribs 9, being retained in such perforations by keys 16 or other suitable fastening means.

The hub 17 of the traction wheel is provided at the center with an annular spacing flange 18, and mounted on the hub at opposite sides of the flange are rotary sleeves 19 provided at their inner ends with annular flanges 20 extending beyond the periphery of the central spacing flange 18 and provided with perforations 21 for the reception of laterally bent inner terminals 22 of the connecting rods. The rods are located in substantially the center plane of the traction wheel, and the inner terminals 22, which extend laterally, are secured in the perforations by nuts 23, washers being interposed between the nuts and the outer faces of the flanges 20, but any other suitable fastening means may, of course, be employed. The rotary sleeves are preferably sectional, as shown at 24 in Fig. 3 of the drawing, the sections being substantially cylindrical and secured together by bolts 25 or other suitable fastening device. This construction enables the sleeves to be readily applied to the hub, which may have its annular flanges formed integral with it. The hub is provided with outer annular spoke-supporting flanges 26, and it has intermediate annular flanges 27 located at the outer ends of the adjustable sleeves 19, the spaces between the central flange 18 and the intermediate flanges 27 being of a proper size to form bearings for the adjustable sleeves 19. Each sleeve is connected with the rods of one of the sets or series of radially arranged plates or blades, and it is provided with an operating arm 28 carrying a pivoted dog or detent 29 arranged to engage notches 30 in the inner face of the adjacent intermediate flange 27. The operating arm 28 is located at the outer end of the sleeve 19 and it is provided at its outer end with a handle or grip and terminates short of the inner ends of the adjacent guides, so that the latter will not interfere with the oscillatory movement of the operating arm in adjusting the sleeve 19.

The notches 30 are arranged at suitable intervals and the sleeve is adapted to be rotated on the hub to project the plates or blades the desired distance, the range of movement, in practice, being designed to be from approximately one inch to six inches, but the size and movement of the plates or blades may, of course, be varied to satisfy the conditions and requirements of the traction wheels for which the devices are designed. The dogs or detents 29 are pivoted in slots 31 of the operating arms and are preferably maintained in engagement with the intermediate ratchet flanges 27 by coiled springs 32 disposed on connecting rods 33 extending from the dogs or detents 29 to latch levers 34. The latch levers 34 are pivotally mounted on the operating arms adjacent to the handles or grips thereof.

What is claimed is:

1. A wheel of the class described, including radially slidable plates or blades mounted at the rim of the wheel and arranged in separate sets or series, and separate manually operable means mounted on and carried by the wheel and connected with the sets or series, whereby the sets or series may be independently operated to permit the plates or blades to be extended while out of contact with the ground.

2. A traction wheel comprising a rim, a hub having a spoke-supporting flange, and a fixed annular flange spaced laterally from the spoke-supporting flange, extensible plates mounted on the rim and movable inwardly and outwardly with respect thereto, a rotatable sleeve mounted on the hub and bearing at one end against the fixed flange and provided with an annular flange at the other end, means for connecting the last-mentioned flange and the extensible plates, an operating arm located at the other end of the sleeve adjacent the fixed flange of the hub, and a pivoted dog carried by the arm and adapted to engage notches in the fixed flange for locking the sleeve and the plates in their adjustment.

3. A wheel of the class described, including a rim, a hub, extensible plates mounted on the rim and arranged in two separate sets or series, sleeves mounted on the hub of the wheel for independent rotation, separate sets of rods connecting the sleeves with the plates, and means for rotating the sleeves and for locking the same in their adjustment.

4. A wheel of the class described, including a rim, a hub having spaced ratchet flanges provided at intervals with notches, extensible plates mounted on the rim and arranged in separate sets or series, independently adjustable sleeves arranged on the hub between the ratchet flanges, separate sets of rods connecting the sleeves with the plates, operating arms carried by the sleeves, and locking means mounted on the arms and arranged to engage the notches of the ratchet flanges.

5. A wheel of the class described, including a rim, a hub having outer spoke-supporting flanges and provided with a central spacing flange, said hub being also provided at opposite sides of the central flange with ratchet flanges having notches, extensible plates mounted on the rim, spaced independently adjustable sleeves mounted on the hub between the central and ratchet flanges and provided at their inner ends with flanges, rods pivoted at their inner ends to the flanges of the hubs and at their outer ends to the said plates, operating means carried by the sleeves, and locking means engaging the ratchet flanges for securing the sleeves in their adjustment.

In testimony, that I claim the foregoing as my own, I have hereto affixed my signature in the presence of two witnesses.

CLAUDE F. WASHBURN.

Witnesses:
B. M. VAUGHAN,
CATHERINE VAUGHAN.